Patented Jan. 14, 1930

1,743,403

UNITED STATES PATENT OFFICE

LEE T. SMITH, OF KENVIL, NEW JERSEY, ASSIGNOR TO HERCULES POWDER COMPANY, OF WILMINGTON, DELAWARE, A CORPORATION OF DELAWARE

METHOD FOR THE SEPARATION OF ALPHA-TERPINEOL FROM PINE OIL

No Drawing.     Application filed August 11, 1927. Serial No. 212,299.

My invention relates to a method for the separation of alpha-terpineol from pine oil.

It is known that among other constituents pine oil contains alpha-terpineol, which has a boiling point of about 218° C. Alpha-terpineol has been separated from pine oil by fractionation. However, such method of separation is unsatisfactory and uneconomical from a practical standpoint. According to my invention, I provide a method for the separation from pine oil of alpha-terpineol in crystalline form by the practice of which the alpha-terpineol may be recovered with economy, both from the standpoint of cost and yield.

In accordance with the method embodying my invention, pine oil, such as is obtained, for example, from pine wood by any well known process, is fractionated and a fraction boiling within the range from about 205° C. to about 220° C. separated. Preferably the fraction separated will have a boiling range from about 214° C. to about 220° C. The fractionation of the pine oil may be carried out with or without steam and is preferably carried out under reduced pressure, though it will be understood that the fractionation may be carried out at atmospheric pressure. Fractionation under reduced pressure is preferable because of higher yield of alpha-terpineol and since lower temperatures may be used with less decomposition and polymerization and the products recovered possess a more pleasant odor and probably greater purity.

After separating the fraction from the pine oil, the fraction, which is rich in alpha-terpineol, is refrigerated to a temperature within the range about 0° C. to about −30° C., preferably to about −15° C. As a result of refrigeration the alpha-terpineol will crystallize and may be separated from the mother liquor in crystalline form, by filtration or by centrifuging. Instead of refrigerating the pine oil fraction to effect crystalization, it may be merely cooled and then seeded with a crystal, preferably of alpha-terpineol, which will cause the alpha-terpineol present in the cut to crystallize and enable its separation by filtration or centrifuging. If desired, the pine oil cut seeded with alpha-terpineol may also be refrigerated with the result that the time required for crystallization of the alpha-terpineol present in the cut will be reduced.

Instead of seeding the pine oil fraction with a crystal of alpha-terpineol, the alpha-terpineol in the cooled fraction may be caused to crystallize by mechanical means, as by adding to the fraction a small piece of broken glass, a grain of sand or a crystalline fragment of salt, etc. Thus, it will be understood that when in the claims appended hereto reference is made to seeding in order to induce crystallization, it is intended also to include any mechanical means for inducing crystallization.

In accordance with the method embodying my invention, a yield of alpha-terpineol amounting to twenty to thirty per cent or more of the original pine oil may be obtained and the alpha-terpineol will be substantially pure.

Further, the method in accordance with my invention may be readily practiced without the use of any particular form of apparatus and at a minimum of expense.

Having now fully described my invention, what I claim and desire to protect by Letters Patent is:

1. The method of separating alpha-terpineol from pine oil, which includes fractionating the pine oil to obtain a cut rich in alpha-terpineol and which will boil at normal atmospheric pressure largely within the range about 205° C.–220° C. and effecting the crystallization of alpha-terpineol present in the cut.

2. The method of separating alpha-terpineol from pine oil, which includes fractionating the pine oil to obtain a cut, which will boil at normal atmospheric pressure largely within the range about 214° C.–220° C., and effecting the crystallization of alpha-terpineol present in the cut.

3. The method of separating alpha-terpineol from pine oil, which includes fractionating the pine oil under reduced pressure to obtain a cut rich in alpha-terpineol and which will boil at normal atmospheric pressure largely within the range about 205° C.–220° C. and effecting the crystallization of alpha-terpineol present in the cut.

4. The method of separating alpha-terpineol from pine oil, which includes fractionating the pine oil to obtain a cut rich in alpha-terpineol and which will boil at normal atmospheric pressure largely within the range about 205° C.–220° C. and seeding the cut to induce the crystallization of alpha-terpineol present in the cut.

5. The method of separating alpha-terpineol from pine oil, which includes fractionating the pine oil under reduced pressure to obtain a cut rich in alpha-terpineol and which will boil at normal atmospheric pressure largely within the range about 205° C.–220° C. refrigerating the cut and inducing crystallization of alpha-terpineol present in the cut.

6. The method of separating alpha-terpineol from pine oil, which includes fractionating the pine oil to obtain a cut, boiling within the range from about 214° C to about 220° C., refrigerating the cut and mechanically inducing crystallization of alpha-terpineol present in the cut.

7. The method of separating alpha-terpineol from pine oil, which includes fractionating the pine oil to obtain a cut, boiling within the range from about 214° C. to about 220° C. seeding the cut with a crystal of alpha-terpineol and refrigerating to effect crystallization of alpha-terpineol present in the cut.

8. The method of separating alpha-terpineol from pine oil, which includes fractionating the pine oil to obtain a cut rich in alpha-terpineol and which will boil at normal atmospheric pressure largely within the range about 205° C.–220° C., seeding the cut to induce the crystallization of alpha-terpineol present in the cut and separating the crystallized alpha-terpineol from the mother liquor.

In testimony of which invention, I have hereunto set my hand, at Kenvil, New Jersey, on this 1st day of August, 1927.

LEE T. SMITH.